United States Patent [19]
Park

[11] Patent Number: 5,675,424
[45] Date of Patent: Oct. 7, 1997

[54] IMAGE DECODER FOR IMAGE COMPRESSION/EXPANSION SYSTEM

[75] Inventor: Jong Seok Park, Kwangmyung, Rep. of Korea

[73] Assignee: Goldstar Co., Ltd., Seoul, Rep. of Korea

[21] Appl. No.: 385,215

[22] Filed: Feb. 8, 1995

Related U.S. Application Data

[63] Continuation of Ser. No. 62,626, May 18, 1993, abandoned.

[30] Foreign Application Priority Data

May 19, 1992 [KR] Rep. of Korea ............... P92-8409

[51] Int. Cl.$^6$ ............... H04N 1/41; H04N 1/415
[52] U.S. Cl. ............... 358/426; 358/433; 382/232; 382/234; 382/236; 348/398; 348/413
[58] Field of Search ............... 358/426, 261.2, 358/261.3, 430, 432, 433; 382/232, 233, 234, 236, 239, 248, 250, 251; 348/411, 412, 413, 414, 398

[56] References Cited

U.S. PATENT DOCUMENTS

| 5,130,797 | 7/1992 | Murakami | 358/133 |
| 5,150,432 | 9/1992 | Ueno | 382/56 |
| 5,177,797 | 1/1993 | Takenaka et al. | 382/234 |
| 5,251,028 | 10/1993 | Iu | 348/400 |

Primary Examiner—Thomas D. Lee
Attorney, Agent, or Firm—Pennie & Edmonds

[57] ABSTRACT

An image decoder for an image compression/expansion system of HDTV or MPEG standard having an image motion compensation process, in which transform coding of video signal is parallel-processed in the unit of a predetermined image block with a reduced-speed clock, and at the same time, motion compensation is processed in the unit of overall picture with an original high speed clock. According to the present invention, motion compensation errors generated in contour portions of respective parallel-processed subpictures can be prevented and accordingly, picture quality can be improved and also hardware construction can be simplified.

5 Claims, 3 Drawing Sheets

FIG. 5A □ : BLOCK (8×8 PIXEL)

: MACRO BLOCK (2×2 BLOCK)

FIG. 5C : SLICE

FIG. 5D : IMAGE FRAME

IMAGE DECODER FOR IMAGE COMPRESSION/EXPANSION SYSTEM

This is a continuation of application Ser. No. 08/062,626, filed May 18, 1993, now abandoned.

BACKGROUND OF THE INVENTION

1. Field of the Invention

The present invention relates to an image decoder for an image compression/expansion system of HDTV or MPEG standard, and more particularly to an image decoder for an image compression/expansion system which separately performs a signal process for an overall picture and a parallel signal process for a unit picture divided from the overall frame, thereby enabling stable image decoding by a low speed clock in an image compensated image compression/expansion system.

2. Description of the Prior Art

Generally, with reference to FIG. 1, the HDTV or MPEG standard image compression/expansion system comprises an image encoder section 10 for transforming original image data into image-compressed data, a variable length code (hereinafter referred to as VLC) encoder 20 for transforming the image-compressed data into a VLC, and a transmitting section 30 for transmitting an output of the VLC encoder 20 to a proper transmission medium such as antenna, cable, etc. Also, the image compression/expansion system comprises a receiving section 40 for demodulating received data, a VLC decoder 50 for transforming data inputted through the receiving section 40 into a fixed length code (hereinafter referred to as FLC), and an image decoder section 60 for restoring FLC-transformed data into original image data and outputting the restored data to a display section (not illustrated).

A clock frequency required in such video signal process is approximately above 75 MHz in case of a HDTV signal having an image bandwidth of 30 MHz. The video signal is digitized with the clock frequency as a sampling frequency, and accordingly, real time process of video signal is enabled if the image encoder section and the decoder section can continuously process the signal having such a high frequency. The conventional image encoder section and decoder section apply a parallel processing method with division of picture to process a video signal with a clock signal having a relatively lower frequency.

That is, with reference to FIG. 2, after one frame image is divided into n subpictures P1 through Pn and image data on respective subpictures are parallel-signal processed by n encoders (or decoders) operated individually, and the signal process for the overall frame is completed by summing the outputs of the respective encoders.

The schematic construction of the conventional encoder section 10 and decoder section 60 applied with the parallel processing method using such picture division is shown in FIGS. 3A and 3B.

With reference to FIG. 3A, the conventional image encoder section 10 comprises a multiplexer 11 for dividing original image data (sampling frequency:fs) sampled with a clock signal having a very high frequency into image data corresponding to the respective n subpictures shown in FIG. 2, encoders 12a through 12n for processing one by one image data on respective subpictures P1 through Pn divided by the multiplexer 11 while 1-frame data are inputted, and a demultiplexer 13 for summing image data of the respective subpictures processed by the respective encoders 12a through 12n and outputting reduced image data corresponding to overall frame. Since the respective encoders 12a through 12n signal-process one by one the divided subpictures during inputting of 1-frame data, image data process is enabled by a clock frequency reduced into fs/n.

Meanwhile, with reference to FIG. 3B, the decoder section 60 comprises a multiplexer 61 for receiving reduced image data, decoders 62a through 62n, and a demultiplexer 63. The decoder section 60 inversely performs the signal process of the above encoder section 10, thereby outputting image data restored to original image data.

Accordingly, in this case, the decoders 62a through 62n signal-process one by one the divided subpictures while 1-frame image data are inputted, so that image data process by the clock frequency reduced into fs/n is enabled.

However, when such a conventional decoder (or encoder) of parallel processing method using division of picture is applied in an image compression/expansion system performing image motion compensation, many processing errors are generated in contour portions of subpictures when image motion is generated in contour portion of respective subpictures, and accordingly, there is a problem of causing large deterioration of picture quality.

Meanwhile, a signal processing method overlapping the contour portions of subpictures is used to overcome the above deterioration of picture quality in contour portions, but there is difficulty in controlling accompanied in processing of overlapped portion, and accordingly, there is a problem of having a complicated construction.

SUMMARY OF THE INVENTION

It is an object of the present invention to provide a decoder for an image compression/expansion system, which prevents generation of motion compensation error in contour portion of respective subpictures, thereby improving picture quality.

It is another object of the present invention to provide an image decoder for an image compression/expansion system, which simplifies the hardware construction for image decoding, thereby reducing manufacture cost.

To achieve the objects, the present invention discloses an image decoder for an image compression/expansion system, which comprises:

transform coding means for dividing input image data per macro block with a predetermined unit, and performing a parallel transform coding process for each divided image data of a predetermined unit with a reduced clock frequency;

motion compensating means for performing a motion compensation process for the image data in the unit of macro block according to inputted motion vector information; and adding means for adding the respective output image data of the transform coding means and the motion compensating means to restore original image data.

BRIEF DESCRIPTION OF THE DRAWINGS

The above objects and other advantages of the present invention will become more apparent by describing the preferred embodiments of the present invention with reference to the attached drawings, in which:

FIGS. 5A through 5D are views showing data of HDTV image for explaining the operation of the present invention.

DETAILED DESCRIPTION OF THE PREFERRED EMBODIMENTS

Figure 1:
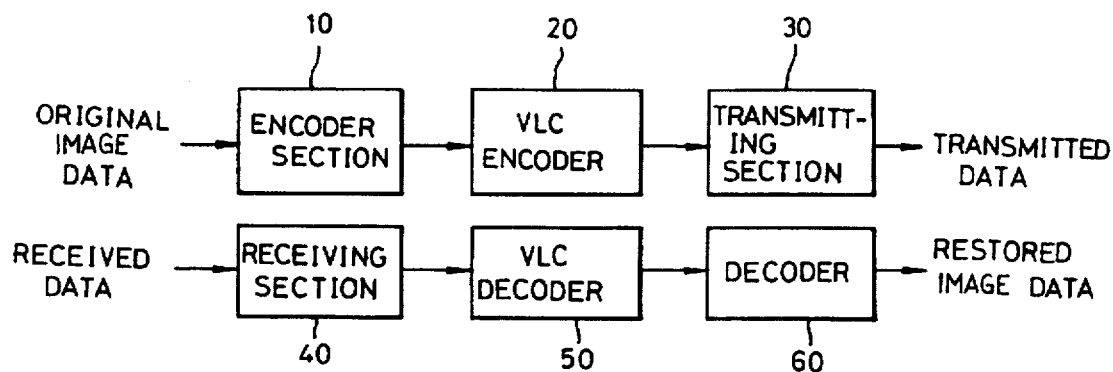
FIG. 1 is a block diagram of a general HDTV or MPEG standard image compression/expansion system.
Figure 2:
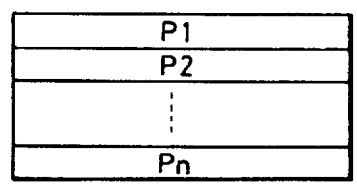
FIG. 2 is a view showing an image frame for explaining a parallel processing method using division of picture.
Figure 3A:
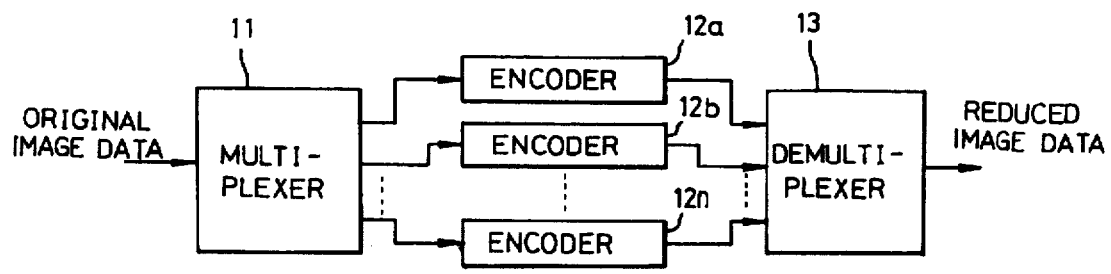
FIG. 3A is a block diagram of an image encoder section according to a conventional parallel processing method.
Figure 3B:
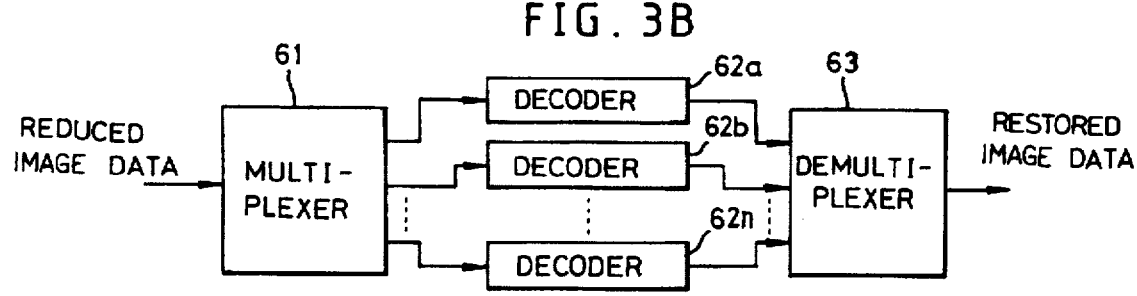
FIG. 3B is a block diagram of an image decoder section according to a conventional parallel processing method.
Figure 4:
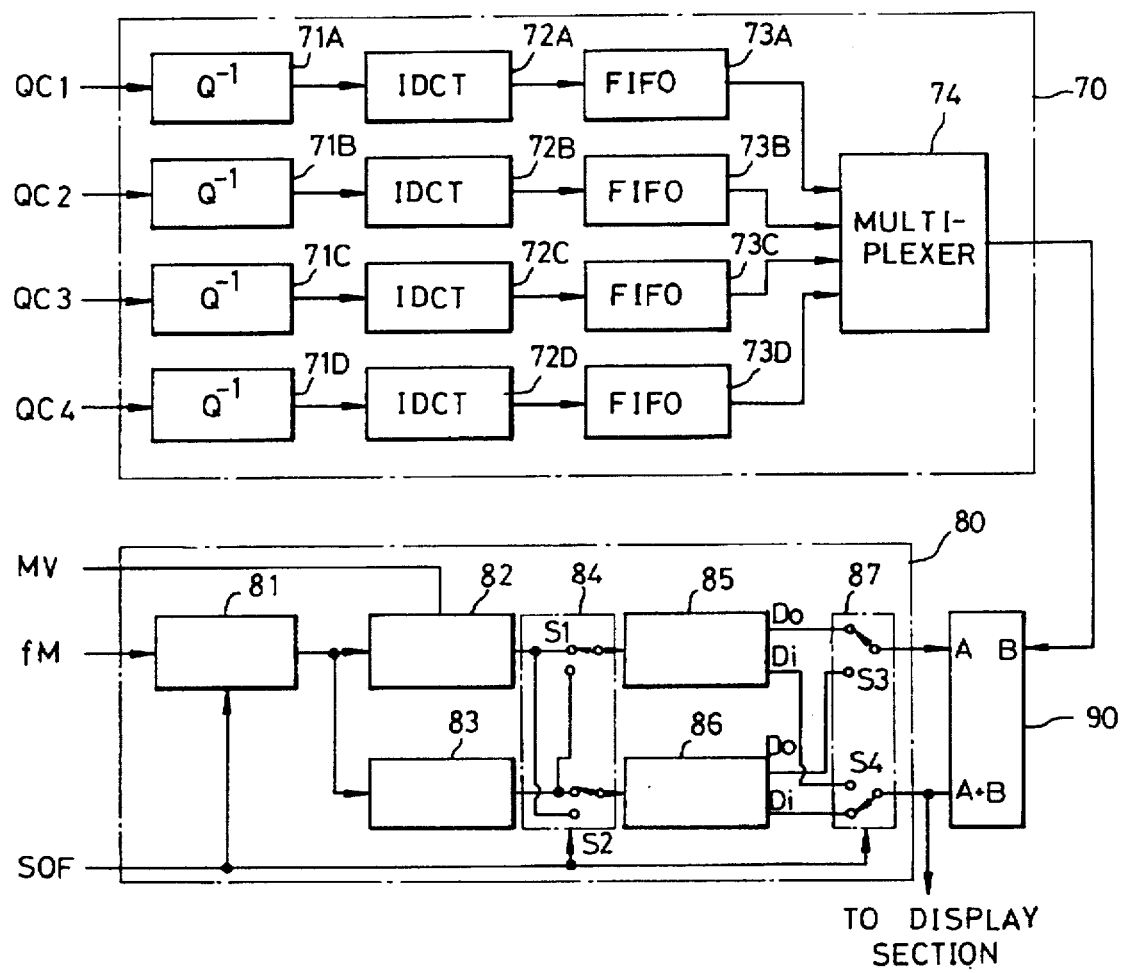
FIG. 4 is a block diagram showing an embodiment of an image decoder according to the present invention.

With reference to FIG. 4, a decoder of the present invention comprises a transform coding section 70 for receiving a quantized coefficient of each block unit within a macro block and performing a parallel transform coding for the coefficient with a reduced frequency, a motion compensating section 80 for receiving information on motion vector MV of macro block unit and processing motion compensation of frame image data and outputting motion compensated data, and an adder 90 for summing the respective image data of the transform coding section 70 and the motion compensating section 80, thereby restoring and outputting original image data.

In an embodiment of the present invention, the transform coding section 70 comprises inverse quantizers 71A, 71B, 71C, and 71D for inverse-quantizing quantized coefficients QC1 through QC4 in the unit of block within a macro block, inverse discrete cosine transformers (hereinafter referred to as IDCT) 72A, 72B, 72C, and 72D for performing inverse coding transform for inverse-quantized signal, thereby restoring an original signal, first-in first-out (hereinafter referred to as FIFO) memories 73A, 73B, 73C, and 73D for reading/writing restored image data of macro block to be matched to timing of a clock signal and pixel data, and a multiplexer 74 for multiplexing data output from these respective memories.

Meanwhile, the motion compensating section 80 comprises a macro counter 81 for providing an address of currently processed macro block within a frame, a read address generator 82 for receiving an output of the macro counter 81 and information on a motion vector MV, and providing an address of previous frame needed in motion compensation, a write address generator 83 for providing a write address of currently processed frame from an output of the macro counter 81, an address switch 84 for switching and controlling the read or write address in each frame, frame memories 85 and 86 for alternatively reading/writing image data of one frame, and an image data switch 87 for controlling data input/output paths of the memories 85 and 86.

The video signal processing operation by the decoder of the present invention having the above constitution is described in detail.

Figure 5B:
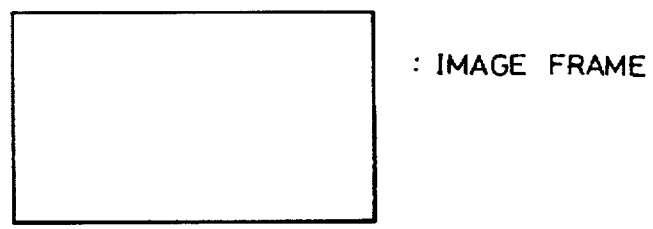

FIG. 5 shows a data structure in a HDTV image, where a minimum unit of image data is a pixel, and a block is composed of 64 pixels, i.e., horizontal pixels×vertical pixels =8×8=64, as shown in FIG. 5A. Also, a macro block is composed of 4 blocks, i.e., 2×2=4, as shown in FIG. 5B. A slice and an image frame are respectively constructed by summing a proper number of macro blocks according to image size, as shown in FIGS. 5C and 5D.

In a HDTV or MPEG standard image compression/ expansion system, a motion compensation method is used to increase the compressibility. At this time, motion vector information is transmitted in the unit of macro block as basic information of data process. Also, DCT (Discrete Cosine Transform) is generally used as a transform coding method for data process.

With reference to FIG. 4, the transform coding section 70 of the present invention performs 4-parallel transform coding process for respective blocks 4-divided from image data of macro block, so that signal process is stably performed with a reduced clock frequency fs/4. Also, the motion compensating section 80 performs motion compensation for one frame image data with a high speed frequency fs in the unit of macro block.

In the transmitting portion (the encoder section), quantized coefficients QC1 through QC4 for four blocks constructing a macro block of image data transmitted after being quantized and being discrete cosine transformed, are restored to original data through the respective inverse quantizers 71A through 71D and IDCTs 72A through 72D within the respective transform coding section 70, and then are supplied to the FIFO memories 73A through 73D.

At this time, the respective inverse quantizers and the IDCTs are operated with a clock having a reduced frequency of fs/4.

Meanwhile, when image data is written in the FIFO memories 73A trough 73D, a clock having a frequency fs/4 is used, and when data is read, a clock having a frequency fs is used. Accordingly, the timing of the transform coding processed image data at a speed of fs/4 is matched to the image data which is motion-compensated at a speed of fs and outputted, and on the other hand, order of pixel data outputted in the respective IDCT 72A through 72D is matched to order of motion compensated pixel data. The written image data from the respective FIFO memories 73A through 73D are multiplexed by the multiplexer 14, and then are supplied to an input terminal B of the adder 90.

Meanwhile, the macro counter 81 in the motion compensating section 80 uses a clock having a macro block frequency fM and is reset by a start-of-frame signal SOF in each frame, and the output value according to the counting operation of the macro counter 81 is supplied to the read address generator 82 and the write address generator 83.

Accordingly, the read address generator 82 generates read addresses of the frame memories 85 and 86, using motion vector information MV and an output of the macro counter 81, and the write address generator 83 generates write addresses of the frame memories 85 and 86, using an output of the macro counter 81.

The address values outputted in the respective address generators 82 and 83 are alternatively supplied to the frame memories 85 and 86 as read and write addresses according to the switching operation of the address switch 84. The image data read in the frame memories 85 and 86 are supplied to the other input terminal A of the adder 90 according to switching of data switch 87.

That is, whenever a start-of-frame signal SOF is inputted, the respective switches 84 and 87 are switched. That is, in an arbitrary frame, switch contacts S1 and S2 within the switch 84 are respectively switched to the read address generator 82, and the side of write address generator 83, and switch contacts S3 and S4 within the switch 87 are respectively switched to the frame memory 85 (data output terminal Do) and the frame memory 86 (data input terminal Di).

Accordingly, in this case, image data of previous frame stored in the frame memory 85 is read and then is supplied to the input terminal A of the adder 90. After the previous frame image data is added at a speed of fs into output data of the transform coding section 70 inputted in the other input terminal B of the adder 90, the added data is supplied to the display section (not shown) through an output terminal A+B and on the other hand, is supplied to the data input terminal Di of the frame memory 86 and is written in the frame memory 86.

Meanwhile, in a next frame, the respective switch contacts S1 through S4 are switched to the other terminals, and accordingly, data read in the frame memory 86 is supplied to the adder 90, whose output is stored in the frame memory 85. Such an operation is repeated in every image frame.

Figure 6:
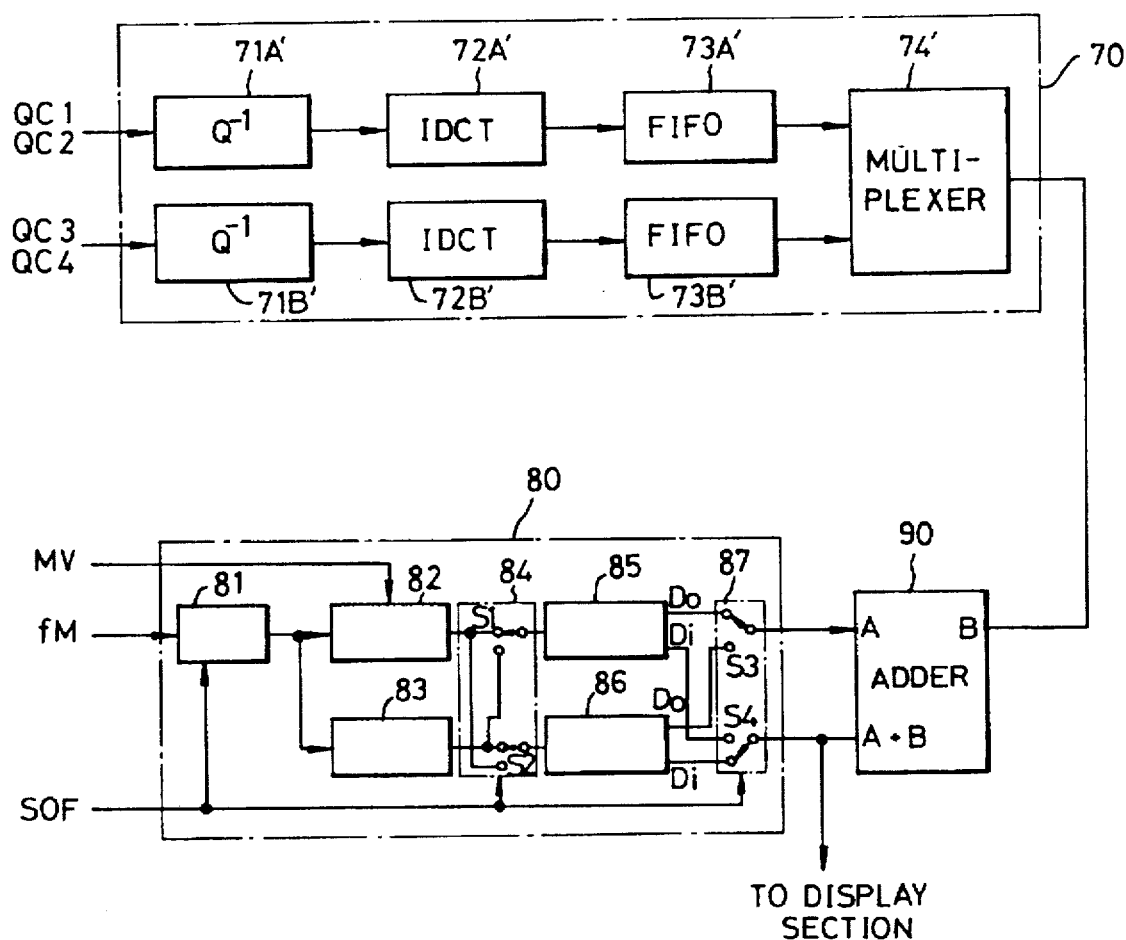
FIG. 6 is a block diagram showing another embodiment of an image decoder according to the present invention.

FIG. 6 shows another embodiment of the present invention, which can be applied in an image compression/ expansion system of a MPEG standard having a lower resolution than a HDTV, even if the transform coding speed is about fs/2. Accordingly, the transform coding section 70 for performing 2 parallel data process for quantized coefficients QC1 and QC2 and quantized coefficients QC3 and QC4 ½-divided from the respective quantized coefficients QC1 through QC4 in the unit of a macro block, comprises inverse quantizers 71A' and 71B', IDCTs 72A' and 72B', FIFO memories 73A' and 73B', and a multiplexer 74'. The data processing operation of the transform coding section 70 having the above constitution is the same as that of FIG. 4.

As described above, according to the present invention, since in an image compression/expansion system, parallel transform coding process by a low speed clock and motion compensating process by a high speed clock are performed simultaneously, motion compensation errors generated in contour portion of divided pictures can be excluded, and accordingly, improvement of picture quality and stable operation characteristic can be obtained. Also, circuit element of low-speed data process can be adapted, thereby simplifying system design and manufacture, and reducing the manufacture cost. Meanwhile, in embodiments of the present invention, an image decoder is described, but it is clear that the concept of present invention can be applied in an image encoder.

While the present invention has been described and illustrated herein with reference to the preferred embodiment thereof, it will be understood by those skilled in the art that various changes in form and details may be made therein without departing from the spirit and scope of the invention.

What is claimed is:

1. A low speed parallel processing image decoder for an image compression/expansion system comprising:

a transform coder, wherein said transform coder receives input image data per macro block, said macro block having a predetermined number of block of divided input image data, and performs a parallel transform coding for each divided image data of said blocks within said macro block with a reduced clock frequency, wherein said transform coder comprises at least two inverse quantizers for inverse-quantizing respective quantized coefficients of said predetermined number of blocks within each macro block, a corresponding number of inverse discrete cosine transformers for performing inverse coding transform for said inverse-quantized signal thereby restoring an original signal, a corresponding number of memories for reading/writing restored image data of each block for matching the timing of a clock signal and pixel data, and a multiplexer for multiplexing data output from each memory;

a motion compensator, wherein said motion compensator performs a single way motion compensation for said image data for each macro block according to input motion vector information, wherein said motion compensator comprises a macro counter for providing an address of currently processed macro block within a frame, a read address generator for receiving an output of said macro counter and said motion vector information, and providing an address of previous frame needed in motion compensation, a write address generator for providing a write address of a currently processed frame from an output of said macro counter address switching means for switching and controlling respective outputs of said read and write address generators in each frame, two frame memories for alternatively reading/writing said image data of one frame, and image data switching means for controlling data input/output paths of said frame memories; and adding means for adding respective output image data of said transform coder and said motion compensator to restore original image data.

2. A low speed parallel processing image decoder for an image compression/expansion system as claimed in claim 1, wherein said macro block comprises four blocks and said transform coder comprises:

four inverse quantizers for inverse-quantizing respective quantized coefficients of said four blocks within a macro block;

four inverse discrete cosine transformers for performing inverse coding transform for said inverse-quantized signal, thereby restoring an original signal; and four memories for reading/writing restored image data of each block to be matched to timing of a clock signal and pixel data.

3. A low speed parallel processing image decoder for an image compression/expansion system as claimed in claim 1, wherein said macro block comprises four blocks and said transform coder comprises two inverse quantizers, and wherein said two inverse quantizers inverse-quantize respective quantized coefficients in pairs of blocks by dividing said four blocks within a macro block, with said two blocks being a pair of blocks.

4. A low speed parallel processing image decoder for an image compression/expansion system comprising:

a transform coder for receiving input image data per macro block, where each macro block has a predetermined number of blocks of divided input image data, and for performing a parallel transform coding for each divided image data of said blocks within each macro block with a reduced clock frequency, wherein said transform coder comprises at least two inverse quantizers for inverse-quantizing respective quantized coefficients of said predetermined number of blocks within each macro block, a corresponding number of inverse discrete cosine transformers for performing inverse coding transform for said inverse-quantized signal, thereby restoring an original signal, a corresponding number of memories for reading/writing restored image data of each block for matching the timing of a clock signal and pixel data, and a multiplexer for multiplexing data output from each memory;

a motion compensator, wherein said motion compensator performs a single way motion compensation for said image data for each macro block according to input motion vector information with a clock frequency higher than that used in said transform coder; and adding means for adding respective output image data of said transform coder and said motion compensator to restore original image data.

5. A low speed parallel processing image decoder for an image compression/expansion system comprising:

a transform coder, wherein said transform coder receives input image data per macro block, said macro block having a predetermined number of blocks of divided input image data, and performs a parallel transform coding for each divided image data of said blocks within said macro block with a reduced clock frequency;

a motion compensator, wherein said motion compensator performs a single way motion compensation for said image data for each macro block according to input motion vector information, wherein said motion compensator comprises a macro counter for providing an address of currently processed macro block within a frame, a read address generator for receiving an output of said macro counter and said motion vector information, and providing an address of previous frame needed in motion compensation, a write address generator for providing a write address of a currently processed frame from an output of said macro counter, address switching means for switching and controlling respective outputs of said read and write address generators in each frame, two frame memories for alternatively reading/writing said image data of one frame, and image data switching-means for controlling data input/output paths of said frame memories; and adding means for adding respective output image data of said transform coder and said motion compensator to restore original image data.

* * * * *